(12) United States Patent
Kim

(10) Patent No.: US 9,212,963 B2
(45) Date of Patent: Dec. 15, 2015

(54) SENSOR WATER FREEZE PROTECTOR

(71) Applicant: Yong C. Kim, Glendale, CA (US)

(72) Inventor: Yong C. Kim, Glendale, CA (US)

(73) Assignee: Barksdale, Inc., Los Angeles, CA (US)

( * ) Notice: Subject to any disclaimer, the term of this patent is extended or adjusted under 35 U.S.C. 154(b) by 287 days.

(21) Appl. No.: 13/902,600

(22) Filed: May 24, 2013

(65) Prior Publication Data
US 2014/0345389 A1 Nov. 27, 2014

(51) Int. Cl.
*G01L 19/06* (2006.01)

(52) U.S. Cl.
CPC ...................................... *G01L 19/06* (2013.01)

(58) Field of Classification Search
CPC .... G01L 19/06; G01L 19/0672; G01L 19/143
USPC .......................................................... 73/700
See application file for complete search history.

(56) References Cited

U.S. PATENT DOCUMENTS

| | | | | |
|---|---|---|---|---|
| 5,747,694 A | * | 5/1998 | Baba et al. | 73/723 |
| 5,900,554 A | * | 5/1999 | Baba et al. | 73/725 |
| 6,439,058 B1 | * | 8/2002 | Aratani et al. | 73/756 |
| 6,575,038 B1 | * | 6/2003 | Takakuwa et al. | 73/706 |
| 8,051,719 B2 | * | 11/2011 | Bigliati et al. | 73/756 |
| 8,408,067 B2 | * | 4/2013 | Zorzetto et al. | 73/756 |
| 2010/0011871 A1 | * | 1/2010 | Bigliati et al. | 73/756 |

* cited by examiner

*Primary Examiner* — Freddie Kirkland, III
(74) *Attorney, Agent, or Firm* — Lawrence S. Cohen

(57) ABSTRACT

Apparatus that detects the pressure of water that can move through a water channel (26) towards and away from a pressure sensor (22), wherein the apparatus is constructed to avoid damage from freezing water. The water channel is constructed with a narrow channel portion (40) and a wide channel portion (42) connected in series, with the narrow channel portion lying closer to the pressure sensor. When the ambient temperature falls below the freezing temperature of water, water in the narrow channel portion freezes before water in the wide channel portion freezes, and frozen water in the narrow channel portion acts like a plug to prevent water (or ice) from moving toward the pressure sensor.

8 Claims, 1 Drawing Sheet

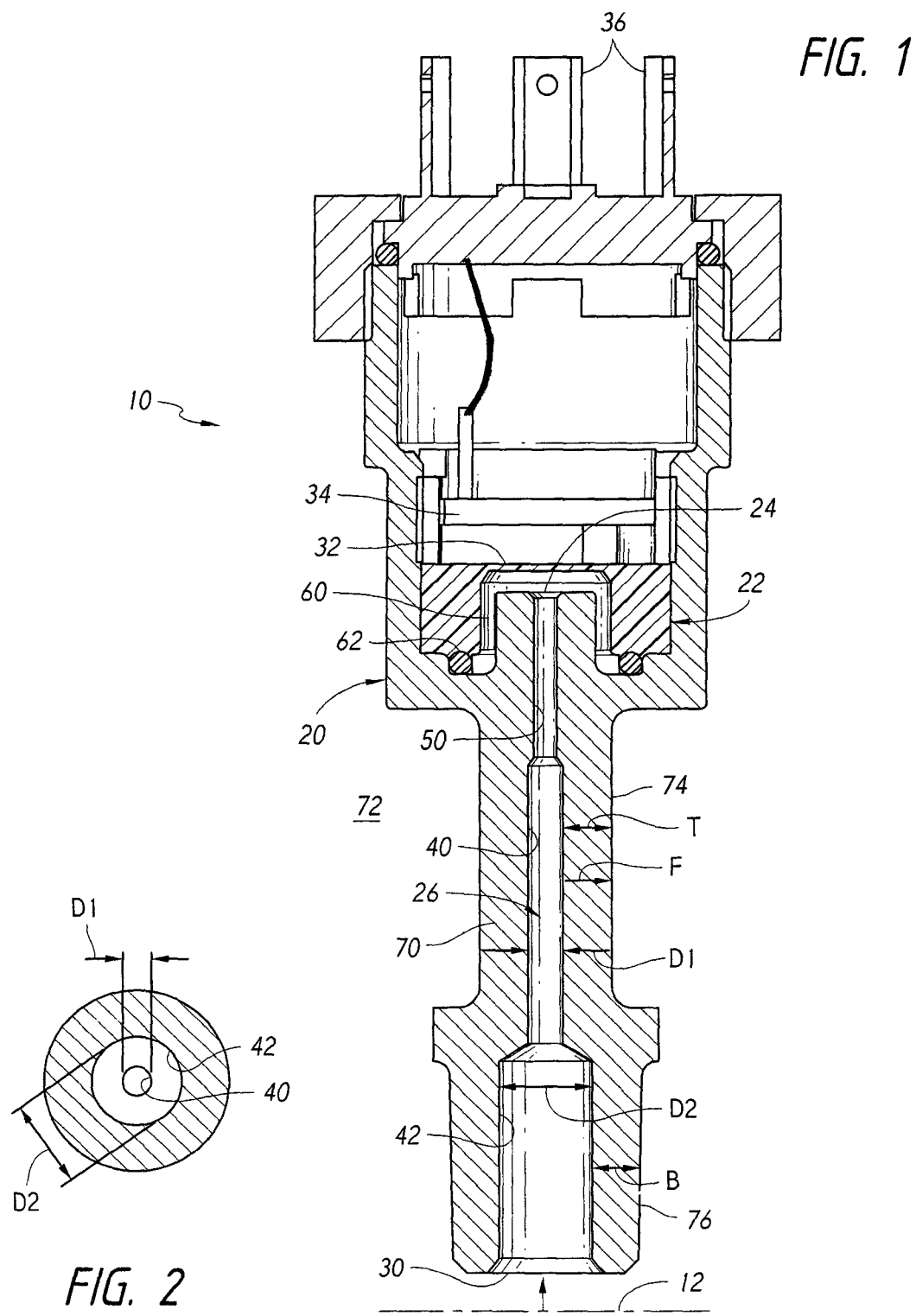

SENSOR WATER FREEZE PROTECTOR

BACKGROUND OF THE INVENTION

Water pressure sensors are used in a wide variety of applications, including monitoring the pressure of water in a local water supply system. One type of pressure sensor apparatus includes a housing that forms a channel with a water inlet at one end of the channel and with a pressure sensor at the far end of the channel. Water can flow through the channel towards and away from the pressure sensor at the far end of the channel.

Water undergoes about a 10% increase in volume when it freezes, and the water can exert an expansion force on the order of magnitude of 110,000 pounds per square inch when it freezes. The expansion force of water in the channel of a pressure sensor apparatus could damage the relatively fragile pressure sensor at the far end of the channel. There is a need for a design of a water pressure sensor apparatus that avoids such damage.

U.S. Pat. No. 8,051,719 describes a pressure sensor device that avoids damage by including a compressible element in the channel that leads to the pressure sensor, or by including a compressible element in a volume that connects to the channel far end. A design that avoided damage without requiring room for an expandable element and without requiring an expandable element itself, would be of value.

SUMMARY OF THE INVENTION

In accordance with one embodiment of the invention, applicant provides a pressure sensor apparatus that avoids damage caused by the expansion of water when the water freezes. The pressure sensor apparatus includes a housing that holds a pressure sensor, with the housing also forming a channel through which water can flow towards or away from the pressure sensor. Water tends to freeze in the channel and thereby expand, to damage the pressure sensor, when the ambient temperature falls below the water freezing temperature.

Applicant constructs the channel with narrow and wide channel portions connected in series, with approximately the same conductivity of heat (or cold) between the ambient atmosphere and each of the channels. Water has a high specific heat, so it takes a lot of heat flow to freeze water, and the required amount of heat flow depends a lot upon the volume or mass of water in the channel. The narrow channel preferably has less than one-half the cross-sectional area of the wide channel, so the narrow channel has less than one half the mass and volume of water that will freeze. As a result, water in the narrow channel will freeze before water in the wide channel will freeze. The frozen water in the narrow channel will act as a plug that prevents water from flowing towards the pressure sensor, and thereby protects the pressure sensor from damage.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a apparatus that detects the pressure of water.

FIG. 2 is a sectional view of the apparatus of FIG. 1.

DESCRIPTION OF THE PREFERRED EMBODIMENTS

FIG. 1 shows a water sensor apparatus 10 which has a water inlet 30 that connects to a pressured water source 12. One example is a municipal or local water supply company that supplies water at a pressure such as on the order of 100 psi (pounds per square inch). The sensor apparatus includes a housing 20 that holds a pressure sensor 22 at a far end 24 of a channel 26. Water can flow into and out of an inlet 30 that lies at one end of the channel, to increase and decrease water pressure at the far end 24. The pressure sensor 22 includes a deflectable part 32 such as one part of a Wheatstone Bridge that is easily deflected. The Wheatstone Bridge part is connected to a circuit board 34 to provide an electrical output to a connector 36 that connects to a meter that indicates water pressure.

When the ambient temperature falls below the freezing temperature of water (32° F.), water in the channel 26 tends to freeze and tends to expand as it freezes. The expanding water tends to apply an increasing pressure to the deflectable part 32 of the pressure sensor 22, and tends to damage it. Applicant avoids such damage by constructing the channel with channel portions 40, 42 of different diameters.

The channel portions 40, 42 are connected in series between the inlet 30 at one end of the channel and the far end 24 where the pressure sensor lies. The channel portions 40, 42 are of different diameters D1 and D2, with the smaller diameter or narrow portion 40 of diameter D1 lying closer to the far end 24 of the channel. This arrangement is used because there is less water per unit length (e.g. per inch) in the narrow channel portion 40 than in the wide channel portion 42. The flow F of heat per unit length of the channel is at about the same rate for the narrow channel portion 40 as for the wide channel portion 42. However, the amount of water per unit length of channel is less for the narrow channel portion 40, so the water in the narrow channel portion freezes before the water in the wide channel portion 42. Once the water in the narrow channel portion 40 freezes, that frozen water acts like a plug to prevent movement of water in the channel. As a result, additional water cannot move against the pressure sensor deflectable part 32 and damage it.

The channel actually includes a third channel portion 50, but as soon as the narrow channel portion 40 freezes, it does not matter what state the water in the third channel portion 50 is in. The third channel portion 50 is even narrower than the second channel portion 40. As a result, water in the lower half of the third channel portion 50 will freeze before water freezes in the first channel portion 42.

The far end 24 of the channel is constructed with a passage 60 of largely U-shaped cross section, although a straight passage can be used instead. This passage 60 separates the entire pressure sensor 22, including the deflectable part 32, from direct contact with walls of the channel, with O-rings 62 lying at the ends of the passage 60.

In a pressure sensor apparatus that applicant has constructed and tested, the channel narrow portion 40 had a diameter D1 of 4.0 mm (millimeters) and the wide channel portion 42 had a diameter D2 of 13 mm. As a result, the cross sectional area of the wide channel portion 42 and the mass of water therein per unit length, was eleven times as great as the cross-sectional area and mass of water per unit length of the narrow channel portion 40. When the ambient temperature dropped below the freezing temperature, it was found that water in the narrow channel section 40 froze before water in the wide channel portion, and the sensor was protected from damage. Although the channel portions are illustrated as being of circular cross section, other cross sections can be used, such as square cross sections in which the two perpendicular dimensions are approximately equal (one is not more than twice the other).

When the ambient temperature drops, heat flows along arrow F through the channel walls 70 into the environment 72. Applicant's housing 20 is constructed of stainless steel, although a wide range of metals can be used. The walls 74, 76 of the narrow and wide channel portions are of about the same thickness T (neither has more than twice the thickness as the other). As a result, heat flows about as fast through the narrow channel portion as the wide portion. Heat flow from the third channel portion 50 is more complex because it involves heat flow through the pressure sensor 22 and through a wide part of the housing 20 that is wider than the channel walls 70. So long as water in one of the channel portion 40, 50 freezes before water in the wide channel portion 42, the channel will be plugged before water expands toward the pressure sensor 22.

Thus, the invention provides apparatus for detecting the pressure of water, which avoids damage when water freezes in a channel leading to a pressure sensor part. The channel is formed with channel portions of at least two different diameters, with the narrow channel portion lying closer to the pressure sensor part than the wide channel, so water in the narrow channel will freeze first and act as a plug against further water movement along the channel.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A pressure detector that has a water inlet and a pressure sensor for sensing the pressure of water in said inlet, said inlet including a channel that carries water toward and away from said pressure sensor, wherein said water in said channel can freeze when the ambient temperature falls below the water freezing temperature, wherein:
    said channel includes narrow and wide channel portions lying in series, with said narrow channel portion lying closer to said pressure sensor than does said wide channel portion, said channel including channel walls that have inside surfaces that form said channels and outside surfaces exposed to the ambient temperature;
    said narrow channel portion is of smaller cross-sectional area than said wide channel portion; and
    said channel includes a third channel portion lying opposite said wide channel portion and connected in series with said narrow channel portion, with said third channel portion being narrower than said narrow channel portion;
    whereby to cause water in said narrow channel portion to freeze and act as a plug before water in said wide channel portion freezes.

2. The pressure detector described in claim 1 wherein:
    said channel portions each has a primarily circular channel cross-section, with the cross sectional area of said wide channel portion being at least twice the cross-sectional area of said narrow channel portion.

3. The pressure sensor described in claim 1 wherein:
    said pressure detector includes a housing with a metal inlet portion through which said channel extends and through which water can pass, and an opposite closed channel end; said closed channel end comprising a deflectable end wall forming part of said pressure sensor.

4. The pressure detector described in claim 1 wherein:
    said narrow and wide channel portions each has a length that is a plurality of times the width of the corresponding channel, and the walls of at least said narrow channel portion are of metal, whereby to quickly cool water in said narrow channel portion.

5. The pressure sensor of claim 1, said metal housing having walls of about the same thickness around said narrow and wide channel portions, and around at least part of said third channel portion.

6. A pressure detector for detecting water pressure in a water source comprising:
    a metal housing forming a channel with metal walls, and a pressure sensor mounted in said housing;
    said channel has inlet that connects to said water source and said channel has a far end that connects to said pressure sensor;
    said channel includes a wide channel portion and a narrow channel portion that are connected in series, said channel portions having walls with outer surfaces lying around said narrow and wide channel portions, with the outer surfaces of said walls being of about the same diameter, and the cross-sectional area of said wide channel being at least twice the cross-sectional area of said narrow channel; and
    said channel includes a third channel portion lying opposite said wide channel portion and connected in series with said narrow channel portion, with said third channel portion being narrower than said narrow channel portion;
    whereby to cause water in said narrow channel to freeze before water in said wide channel freezes.

7. The pressure detector described in claim 6 wherein:
    said pressure sensor surrounding at least part of the said third channel portion.

8. The pressure sensor of claim 6, said metal housing having walls of about the same thickness around said narrow and wide channel portions, and around at least part of said third channel portion.

* * * * *